J. A. MITCHELL.
LIQUID FUEL BURNER.
APPLICATION FILED FEB. 11, 1910.
963,617.
Patented July 5, 1910.
2 SHEETS—SHEET 1.
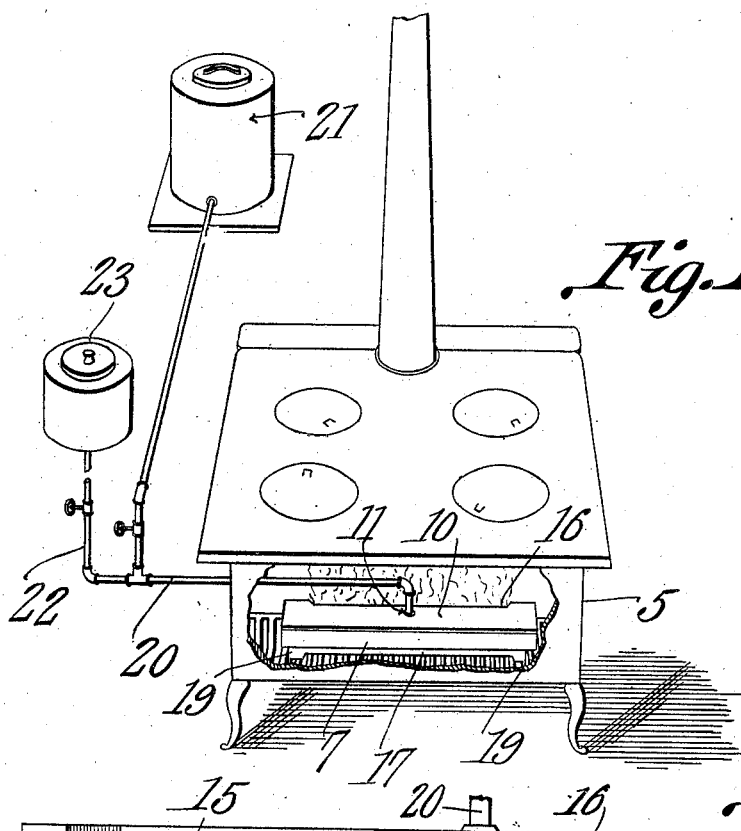
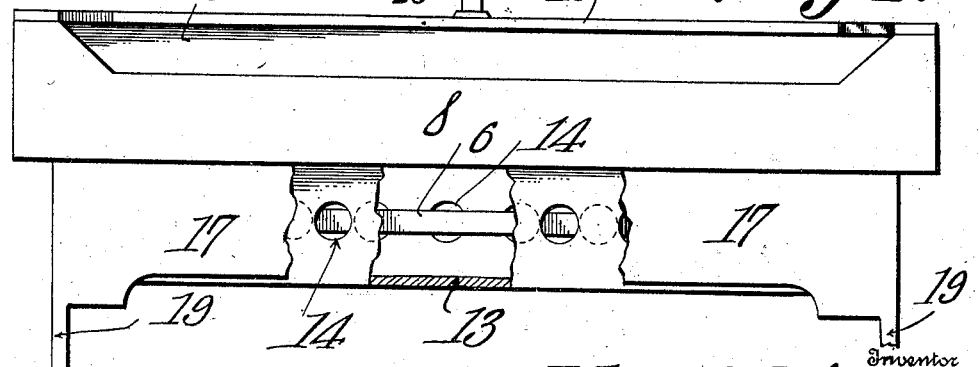
Witnesses
Inventor
John A. Mitchell,
By C. A. Snow & Co.
Attorneys J. A. MITCHELL.
LIQUID FUEL BURNER.
APPLICATION FILED FEB. 11, 1910.
963,617.
Patented July 5, 1910.
2 SHEETS—SHEET 2.
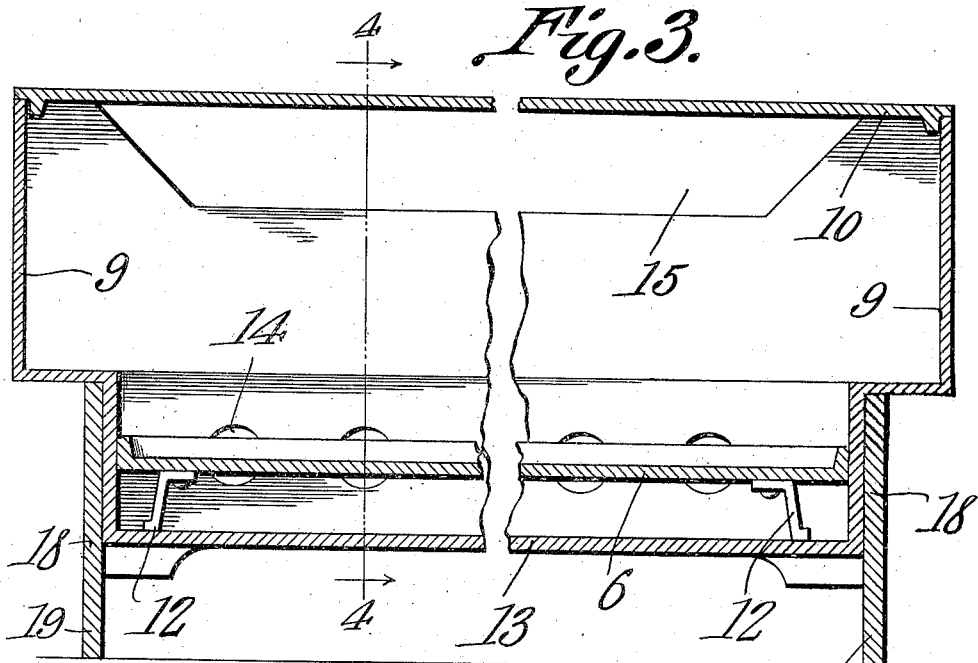
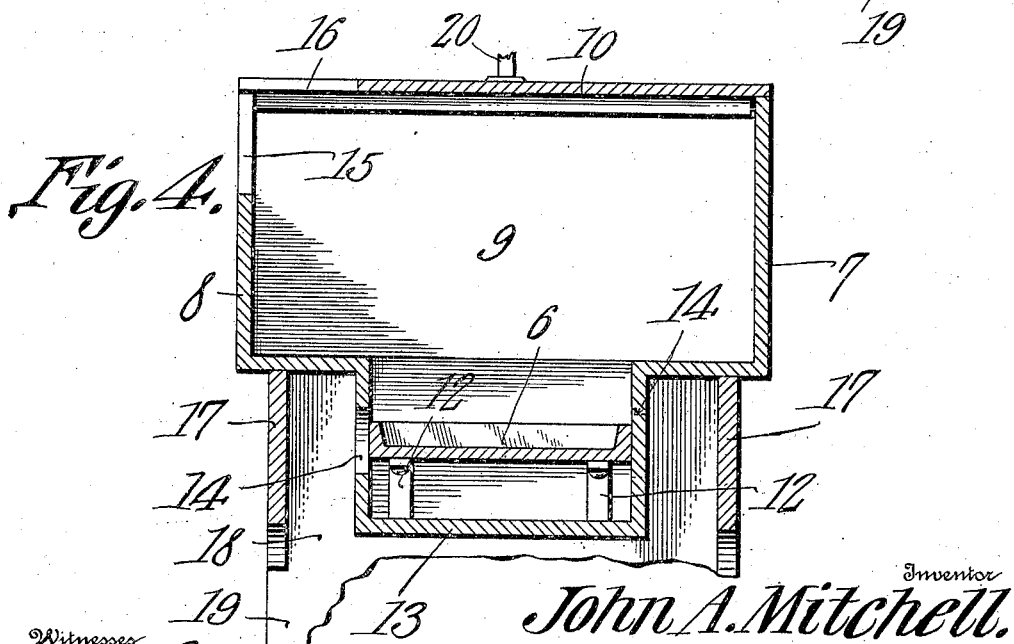
Witnesses
Inventor
John A. Mitchell.
Attorneys

UNITED STATES PATENT OFFICE.

JOHN ALEXANDER MITCHELL, OF TULSA, OKLAHOMA.

LIQUID-FUEL BURNER.

963,617.  Specification of Letters Patent.  Patented July 5, 1910.

Application filed February 11, 1910. Serial No. 543,270.

*To all whom it may concern:*

Be it known that I, JOHN A. MITCHELL, a citizen of the United States, residing at Tulsa, in the county of Tulsa and State of Oklahoma, have invented a new and useful Liquid-Fuel Burner, of which the following is a specification.

This invention has for its object to provide an improved burner for utilizing crude oils, a combustible vapor being formed by discharging the oil into a hot pan or tray. Steam is also generated by discharging water into the pan with the oil, whereby a combustible mixture is produced which makes a hot fire, and consumes all solid matters and impurities present in the oil.

Another object of the invention is to provide an improved burner structure which is simple, and all the parts of which are so assembled that they are readily accessible for cleaning, and other purposes.

The invention also has for its object to provide improved means for feeding air to the burner, an abundant supply of air being assured.

With the herein stated objects in view, the invention consists in a novel construction and arrangement of parts to be hereinafter described and claimed, reference being had to the accompanying drawings forming a part of this specification, in which—

Figure 1 is a perspective view showing the application of the invention, the burner being shown in position within the fire pot of a stove, and the latter being partly broken away. Fig. 2 is an elevation of the burner removed from the stove, parts being broken away. Fig. 3 is a longitudinal section of the burner; and Fig. 4 is a transverse section of the burner on the line 4—4 of Fig. 3.

The burner is so constructed that it may be mounted in the fire pot of any ordinary stove, it being supported on the grate. The drawing shows an ordinary cooking stove 5, to which the burner is shown applied. The burner comprises a casing in which is mounted a shallow open pan or tray 6 into which the oil and water drops. The burner casing is rectangular in form, and consists of front and rear walls 7 and 8 respectively, and end walls 9. To the top of the casing is fitted a removable lid or cover 10 formed with an opening 11 through which the fuel pipe passes so as to discharge into the pan. The bottom portion of the burner casing is reduced, in which reduced portion the pan 6 is mounted said pan being provided with legs 12 whereby it is held spaced a suitable distance above the bottom 13 of the casing.

In the front and rear walls of the reduced portion of the casing, are air inlet openings 14. These openings are so located with respect to the pan 6, that the air is carried across the pan above and beneath the same, the size of the openings being such that the upper portion of said openings extends above the plane of the top portion of the pan, and the lower portion of the openings extends below the plane of the bottom of the pan. The air openings on one side of the burner casing are set staggered with respect to the air openings in the other side of the casing, whereby a series of air currents are caused to travel across the pan alternately in opposite directions.

In the rear wall 8 of the burner casing, at the top thereof, is an opening 15 through which the flames escape, and adjacent to this opening, the top 10 is also cut away for a short distance as indicated at 16.

The casing herein described is supported on a stand comprising an open rectangular frame consisting of side walls 17 and end walls 18, the side walls being spaced from the front and rear walls of the reduced lower portion of the casing in which the air openings 14 are located. This frame is mounted at its ends on feet 19, whereby the entire structure is supported on the grate of the stove, the legs 19 extending a short distance below the plane of the bottom of the burner casing, so as to space said casing a short distance above the grate. Air passing through the grate bars flows into the space between the walls 17 and the lower portion of the front and rear walls of the burner casing, and enters said casing through the openings 14.

The oil supply pipe 20 enters the fire pot of the stove through an opening made in the wall of the stove, and is connected to a supply tank or reservoir 21, suitably elevated to give a gravity feed. To the oil pipe 20 is also connected a pipe 22 leading to a water tank 23. The oil and water pipes will be equipped with valves, and other necessary fixtures.

In operation, the valves of the oil and water pipes will be adjusted to deliver one part of water to two parts of oil. The burner is started by running a small quantity of oil into the pan 6, and then igniting the same. When the pan becomes hot, the oil and water is turned thereinto in the proportions stated. The oil and water dropping into the hot pan, are at once vaporized, and a combustible mixture is produced which makes a hot fire, the flames issuing from the burner through the openings 15 and 16. The steam or water vapor promotes combustion of the vaporized oil, and causes all solid matters and impurities present in the oil to be consumed. An abundant supply of air to support combustion is provided, the air flowing horizontally across the lower part of the burner casing above and below the pan, and alternately in opposite directions, thereby obtaining a perfect mixture of air and vapor, the vapor being taken up by the oppositely flowing air currents, and mixed therewith. Inasmuch as the pan is spaced from the bottom of the casing, the flames can pass under the pan, whereby it is quickly heated, and kept hot during the operation of the burner.

The pan is removable from the burner casing so that it can be readily cleaned. The other parts of the burner are also readily accessible, the burner casing being removably mounted in the supporting frame, and the lid 10 being removable from the casing.

A burner constructed as herein described can be readily applied to any ordinary stove without modifying the structure thereof, and it is efficient in operation, a large hot fire being produced.

What is claimed is:

1. In a liquid fuel burner, a casing having an outlet, a pan mounted therein, means for discharging fuel into the pan, and means for feeding air alternately in opposite directions across the pan above and below the same.

2. In a liquid fuel burner, a casing having an outlet for the products of combustion, and air inlets on opposite sides, a pan in the casing, means for discharging fuel into the pan, and a supporting frame for the casing, said frame being spaced from that portion of the casing having the air inlet openings.

3. In a liquid fuel burner, a casing having an outlet, and provided on opposite sides with a series of air inlet openings, the openings on one side being set staggered with respect to the openings on the opposite side, a pan located in the casing adjacent to the air inlet openings, and means for discharging fuel into the pan.

In testimony that I claim the foregoing as my own, I have hereto affixed my signature in the presence of two witnesses.

JOHN ALEXANDER MITCHELL.

Witnesses:
C. W. McCarty,
Mark E. Carr.